United States Patent [19]

Fong et al.

[11] Patent Number: 4,713,178
[45] Date of Patent: * Dec. 15, 1987

[54] DEWATERING AGENTS

[75] Inventors: Dodd W. Fong, Naperville; Ann M. Halverson, Wheaton, both of Ill.

[73] Assignee: Nalco Chemical Company, Naperville, Ill.

[*] Notice: The portion of the term of this patent subsequent to Aug. 5, 2003 has been disclaimed.

[21] Appl. No.: 851,172

[22] Filed: Apr. 14, 1986

Related U.S. Application Data

[63] Continuation-in-part of Ser. No. 737,954, May 28, 1985, abandoned.

[51] Int. Cl.$^4$ .............................................. C02F 11/14
[52] U.S. Cl. ..................... 210/734; 210/735
[58] Field of Search ............... 210/609, 725, 727, 728, 210/734, 735; 524/922; 525/326.7, 343, 359.5; 526/263; 544/399

[56] References Cited

U.S. PATENT DOCUMENTS

| | | | |
|---|---|---|---|
| 3,284,393 | 11/1966 | Vanderhoff et al. | 524/801 |
| 3,409,546 | 11/1968 | Mogelnicki et al. | 210/728 |
| 3,414,514 | 11/1968 | Buhl | 210/734 |
| 3,897,333 | 7/1975 | Field et al. | 210/734 |
| 3,899,471 | 8/1975 | Lorenz et al. | 210/734 |
| 3,907,758 | 9/1975 | Sackman et al. | 210/734 |
| 4,305,829 | 12/1981 | Kelsey et al. | 210/735 |
| 4,515,658 | 5/1985 | Fong | 162/168.5 |
| 4,604,213 | 8/1986 | Fong et al. | 210/735 |
| 4,659,828 | 4/1987 | Fong | 544/399 |

Primary Examiner—Peter Hruskoci
Attorney, Agent, or Firm—Joan I. Norek; John G. Premo; Donald G. Epple

[57] ABSTRACT

Polymers containing as little as 5 mole percent of 1-acryloyl-4-methyl piperazine are superior flocculants for treating raw sewage sludges and sludges obtained by biological degradation.

2 Claims, 2 Drawing Figures

TEN SECOND TREE DRAINAGE DATA
—△— ACM/DADMAC (32 %)
····O···· EX.12 (5%)
—◇— EX.11 (34%)
---□--- EX.9 (15%)

DEWATERING AGENTS

This application is a continuation-in-part of Ser. No. 737,954, filed May 28, 1985, now abandoned.

INTRODUCTION

This invention relates to polymers that are of particular value as flocculants for suspensions of organic matter of a proteinaceous or cellulosic nature such as are to be found in sewage treatment effluents.

It is commonly accepted that such suspended materials which are hydrophilic in nature and which often have specific gravities quite close to that of the aqueous liquors in which they are suspended, contrast in a marked way with the more hydrophobic mineral suspensions in that they are frequently found to be much more difficult to flocculate economically with chemical reagents prior to a physical dewatering step such as filtration, flotation or sedimentation. These difficulties are particularly noticeable when higher proportions of suspended matter are present, commonly involving concentrations of 0.5 percent by weight upwards wherein the suspensions take on a paste-like consistency and are commonly described as sludges.

It is well known to assist the dewatering of sewage sludges and similar organic suspensions by mixing into them chemical reagents in order to induce a state of coagulation or flocculation which thereby facilitates the process of separation of water. For this purpose, lime or salts of iron or aluminum are in use and more recently synthetic polyelectrolytes, particularly certain cationic copolymers of acrylamide have been found of interest.

Thus, U.S. Pat. No. 3,409,546 describes the use of N-(amino methyl)-polyacrylamides in conjunction with other cationic polymers for the treatment of sewage sludges. U.S. Pat. No. 3,414,514 describes the use of a copolymer of acrylamide and a quaternised cationic methacrylate ester. It is also well known to use polyethyleneimines and homopolymers of cationic acrylates and methacrylates and other cationic polymers such as polyvinyl pyridines. Another class of cationic polymers used to dewater sludges is described in U.S. Pat. No. 3,897,333.

Notwithstanding the variety of commercially available polymers which have been found to be capable of flocculating or coagulating organic sludges, there are various circumstances which tend to limit the usefulness of these reagents. Thus, while on certain sludges economical treatments with these reagents have been found possible, it is quite common to encounter sludges which require very high dosages of reagents in order to treat them successfully. Also variations often occur in sludge from any one source, for example, because of variations in the supply of material to the sludge making process and/or variations in the oxidising conditions that may be involved in the production of the sludge. Furthermore, it is not uncommon to encounter sludges which are, for some reason, not amenable to flocculation by any of the known polymeric flocculating agents.

It has been our object to provide polymeric materials that are improved flocculating agents for organic sludges.

THE INVENTION

The invention is a process of the type wherein organic suspensions comprising raw sewage sludge and sludges obtained by biological degradation are flocculated by adding to the suspension an aqueous solution of a cationic polymer, the improvement which comprises using as the cationic polymer a polymer which contains at least 5 mole percent of the dimethyl sulfate or the methyl chloride quaternary ammonium salt of 1-acryloyl-4-methyl piperazine (AMPIQ).

In a preferred embodiment of the invention, the polymers used are copolymers of acrylamide that contain between 5–50 mole percent of AMPIQ.

Monomers other than acrylamide may be copolymerized with AMPIQ and used to practice the invention. These co-monomers may be either nonionic, cationic, or anionic. Examples of suitable nonionic monomers include: methacrylamide, acrylonitrile, vinyl acetate, N-vinyl pyrrolidone, lower alkyl acrylates, lower alkyl methacrylates, N-alkyl acrylamides, styrene, etc. Examples of suitable anionic co-monomers useful in this invention include: acrylic acid, methacrylic acid, itaconic acid, maleic anhydride, acrylamidomethylpropanesulfonic acid, etc. Examples of suitable cationic monomers which may be useful in this invention include: dimethylaminoethylacrylate, quaternary salts of dimethylaminoethylacrylate, dimethylaminoethylmethacrylate, dimethylaminoethylmethacrylate quaternaries, diallyldimethylammonium chloride, methacrylamidopropyltrimethylammonium chloride, vinyl pyridine, N,N-dimethylaminomethylacrylamide, N,N-dimethylaminomethylmethacrylamide, N,N-dimethylaminomethylacrylamide quaternaries, etc. It is understood the resultant copolymer should be water-soluble.

Preferred in the practice of the invention is the utilization of the polymers or copolymers which have an intrinsic viscosity greater than 0.5 and, preferably, those having an intrinsic viscosity of at least 1 or more.

Figure 1:
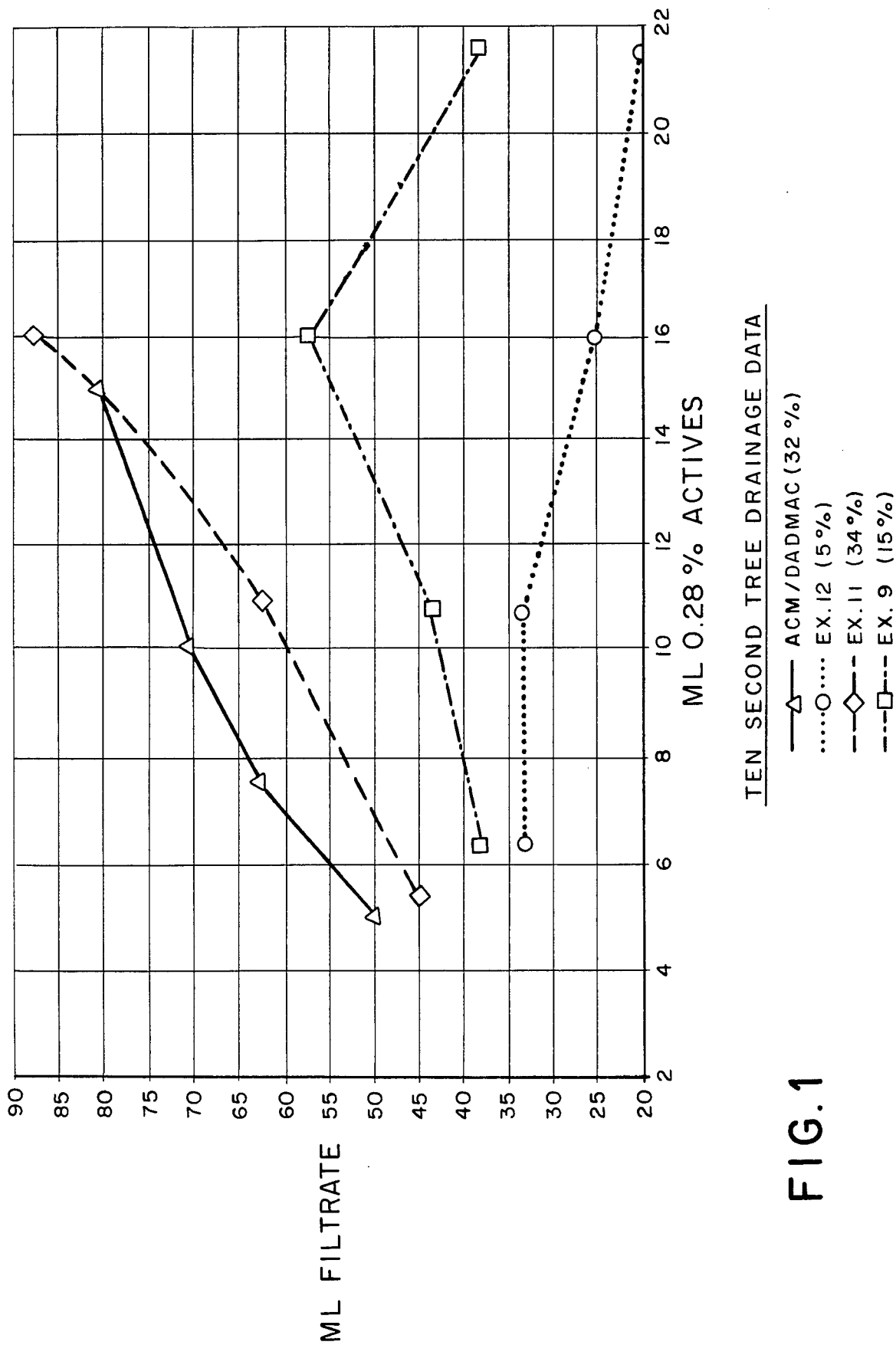
FIGS. 1 and 2 show drainage data obtained by use of the instant polymers.

To illustrate the preparation of the AMPIQ monomers, the following are presented by way of example:

EXAMPLE 1

1-Acryloyl-4-Methyl Piperazine

A mixture of acryloyl chloride (102.0 g, 1.13 moles) in methylene chloride (100 ml) was added dropwise into a solution of N-methyl piperazine (86.0 g, 0.86 moles) in methylene chloride (450 ml) over a period of one hour. During the addition, the temperature of the N-methyl piperazine/methylene chloride was kept below 25° C. After the addition was complete, the reaction mixture was stirred at room temperature for two hours. The reaction mixture was neutralized with 260 g of 17% sodium carbonate solution. The organic layer containing the crude product was separated from the aqueous layer via a separatory funnel. The aqueous layer was washed well with methylene chloride. Combination of the organic phases and rotoevaporation of the solvent yielded 100.0 grams of crude product. Distillation of the crude product yielded a fraction (74°–78° C./5 mm Hg) that was 98% pure by G.C. analysis. $^{13}$C nmr and IR analysis gave spectra consistent with the title compound.

EXAMPLE 2

A

Dimethyl sulfate (23.2 g) was added slowly into a mixture of 30.0 g of 1-acryloyl-4-methyl piperazine and water (51.8 g). The temperature of the reaction mixture was kept below 30° C. After complete addition, the reaction mixture was stirred for 2 hours. A $^{13}C$ nmr spectrum was consistent with the title compound.

B

Into a 300 ml Parr bomb was charged 26.6 g. water, 21 g. 1-acryloyl-4-methyl piperazine, and 10 g. methyl chloride. The valves were closed and the bomb was heated to and maintained at 60° C. until no more methyl chloride was taken up. The product was characterized by $^{13}C$ nmr.

As will be shown hereinafter, the polymers are conveniently prepared using either solution polymerization or the so-called "inverse emulsion polymerization" method which utilizes polymerization of water-soluble vinyl monomers in the form of water-in-oil emulsions. This technique is described in Vanderhoff, U.S. 3,284,393, the disclosure of which is incorporated herein by reference.

A typical polymerization using the so-called "inverse emulsion" technique is set forth below as Example 3.

EXAMPLE 3

Water-in-Oil Emulsion Polymerization of Acrylamide and AMPIQ

| Oil Phase: | |
|---|---|
| LOPS[1] | 130.0 g |
| Sorbitan Monooleate | 7.5 g |
| 4 moles EO reacted with Sorbitan Monostearate | 2.5 g |
| Aqueous Phase: | |
| 50% AMPIP MSQ[2] | 51.25 g |
| 46.4% Acrylamide solution | 246.49 g |
| H$_2$O | 49.92 g |
| Ethylene diamine tetraacetic acid | .05 g |
| Initiator: | |
| 2,2'-Azobisisobutyronitrile | .28 g |

[1]LOPS = A low odor paraffin solvent.
[2]AMPIP MSQ = 1-acryloyl-4-methyl piperazine dimethyl sulfate quaternary ammonium salt.

The oil and the aqueous phases (pH 5) were first prepared and the emulsion was obtained by adding the aqueous solution into the LOPS solution with vigorous stirring. The emulsion was purged with nitrogen for ½ hour and then heated to 45° C. The initiator was added. The reaction was maintained at 45° C. for four hours and at 65° C. for one hour. The reaction was cooled to room temperature. G.C. analysis of the residual monomer shows the polymerization was 74% complete. IV of the copolymer was 7.0.

Typical solution polymerizations are prepared below as Examples 4, 5, and 6.

EXAMPLE 4

50% AMPIP MSQ in water (20.0 g), H$_2$O (70.8 g), and 2% ethylene diamine tetra-acetic acid (2 ml) were combined in a 200 ml resin kettle and heated to 60° C. under a blanket of nitrogen gas. The monomer solution was initiated with ammonium persulfate (0.7 in 5 ml H$_2$O) and the reaction mixture maintained at 60°-65° C. for 3 hours. The temperature was then raised to 70° C. for 1 hour. The resulting polymer had an intrinsic viscosity of 0.23. Residual monomer (920 ppm) was noted.

EXAMPLE 5

50% AMPIP MSQ (20 ml), 2% ethylene diamine tetra-acetic acid (1 ml), 25% sodium formate (0.25 g) and H$_2$O (74.75 ml) were combined in a 200 ml resin kettle. The reaction was run as per Example 4 except 2,2'-Azo bis 2-amidino propane hydrochloride (0.03 g in 4 ml H$_2$O) was used as the initiator. The reaction was heated for 5 hours at 45° C. The resulting polymer had an intrinsic viscosity of 1.78.

EXAMPLE 6

To produce a polymer having an intrinsic viscosity of 1.37, Example 5 was repeated except 1.6 g of a 0.25% sodium formate solution was used.

THE DOSAGE

The addition is usually effected by adding an aqueous solution of the polymer, for example, having a concentration of from 0.01 to 1 percent by weight and, most preferably, from 0.05 to 0.2 percent. The total amount of polymer added may vary considerably according to the suspension being treated and according to the degree of dewatering required. Typical addition rates for a sewage sludge would be in the range 0.1 to 0.5 percent of polymer on total weight of sludge solids. Addition may be by conventional methods and naturally some agitation of the mixture of sludge and flocculant is necessary to bring about flocculation. Thereafter separation of the separated solids from liquid may be effected by conventional methods, for example, by filtration and/or sedimentation.

To illustrate the invention, certain preferred polymeric species of the invention were tested at a filtration plant located in the midwest portion of the U.S. The results of these tests are presented below as Example 14.

Using the above preparative techniques, the following polymers were prepared:

| Example No. | Composition | Wt. % Solids/ Mole % Cationic | RSV[3] | IV | MW |
|---|---|---|---|---|---|
| 7 | Latex copolymer AcAm[4]/AMPIP MSQ | 28.0/5.4 | 12.7 | 9.96 | 7.7 × 10$^6$ |
| 8 | Latex copolymer AcAm/AMPIP MSQ | 24.1/8.70 | 9.9 | 7.9 | 5.34 × 10$^6$ |
| 9 | Latex copolymer AcAm/AMPIP MSQ | 28/15 | 12.1 | 9.35 | 7 × 10$^6$ |
| 10 | Latex copolymer AcAm/AMPIP MSQ | 28/20 | 10.0 | 7.9 | 5.4 × 10$^6$ |
| 11 | Latex copolymer AcAm/AMPIP MSQ | 27.9/34 | 12.9 | 11.0 | 9.1 × 10$^6$ |
| 12 | Latex copolymer AcAm/AMPIP MSQ | 28.1/5.4 | 21.9 | 16.5 | 1.7 × 10$^7$ |
| 13 | Solution AMPIP MSQ | 9.3/N.A. | .77 | .76 | 1.38 × 10$^5$ |

[3]0.045 g polymer/100 cc 1 M NaNO$_3$
[4]AcAm = Acrylamide

EXAMPLE 14

Polymer Evaluation

A. Stability in Alkaline Sludge (pH=11).

The stability of the various polymers tested was as anticipated. Copolymers containing ester linkages were the least stable in pH=11 sludge. In this class, for example, AcAm/DMAEA MCQ[5] when mixed with the sludge, initially exhibited the formation of floc. These floc quickly disintegrated after two inversions in the mixing cylinder. The equivalent AcAm/DMAEM MSQ[6] was more stable than the AcAm/DMAEA MCQ copolymer. Floc formation with this polymer could be developed and sustained over five mixing cylinder inversions and a free drainage run. Its performance in terms of free drainage filtrate was mediocre presumably due to some hydrolysis, and floc formation can be expected to deteriorate for longer times as would occur in a filter press operation.

[5]Dimethylamino ethyl acrylate methyl chloride quat. [6]Dimethylamino ethyl methacrylate dimethyl sulfate quaternary ammonium salt Three copolymers of acrylamide (AcAm) with AMPIQ with variable charge density were investigated. This monomer contains a potentially base hydrolyzable amide linkage. Suitably high charged copolymers gave good floc formation and free drainage indicating stability over the time frame of the free drainage experiment. Again, these results are consistent with the expectation that amides are less susceptible to base hydrolysis than are esters.

B. Effect of Charge and Charge Density.

Cationic Charge.

Figure 2:
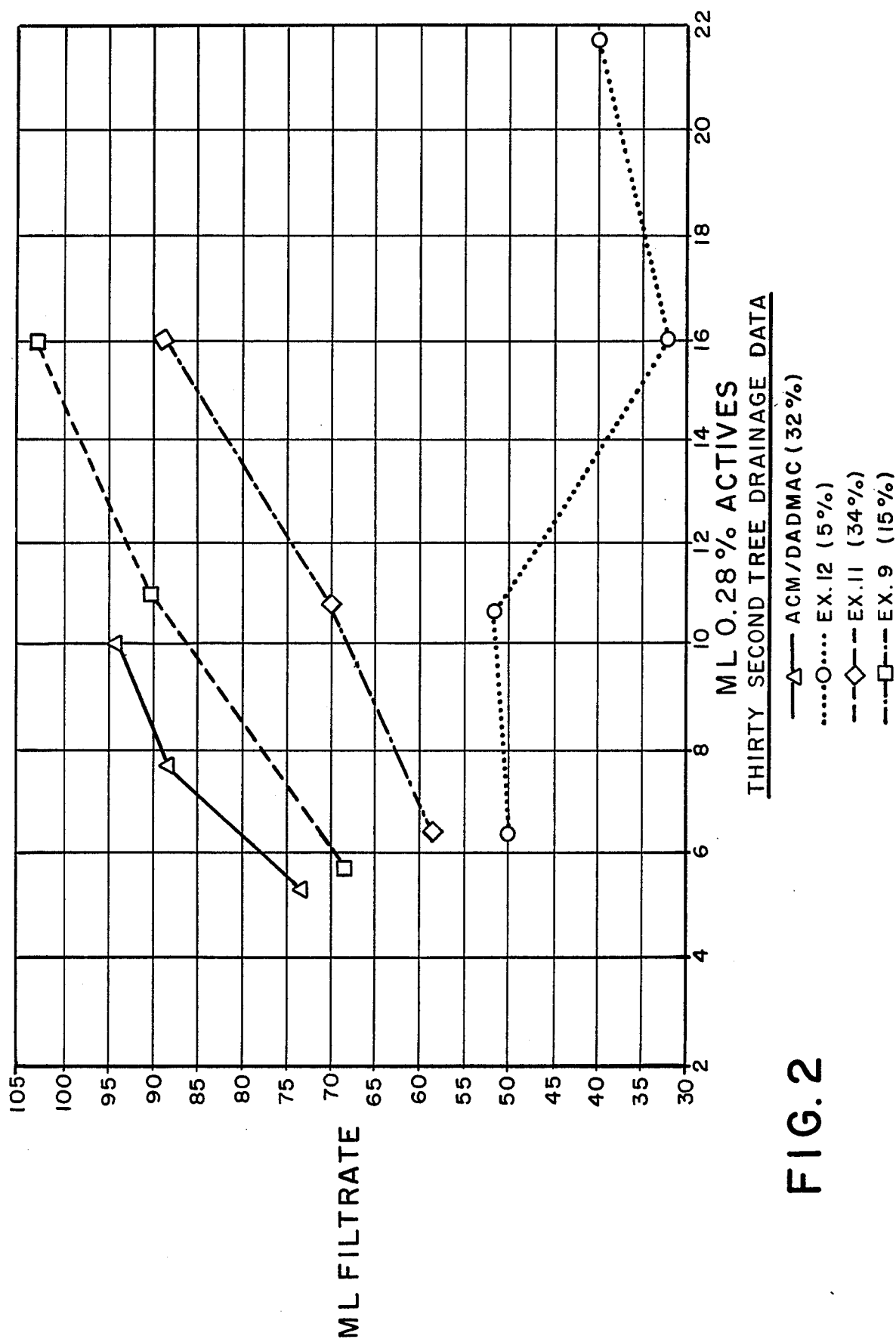

Table I gives the charge densities and RSV's of the AMPIP MSQ copolymers tested. FIGS. 1 and 2 show the free drainage volume versus polymer dose curves at 10 and 30 seconds, respectively. In both FIGS., the AMPIP MSQ copolymers are compared with the results of the 32 mole % DADMAC[7] copolymer which exhibited the best free drainage results. It is notable that the AMPIP MSQ copolymer of similar charge to the DADMAC copolymer gave very similar drainage results. Referring to the FIGS. 1 and 2 along with the Table I indicates that polymer free drainage performance was highly dependent on charge density with the 5 mole % charge density copolymer yielding poor results, the 34 mole % yielding good results, and the 15 mole %, intermediate results. Significantly higher RSV did not help the lower charge density polymer achieve performance comparable with the much lower RSV copolymers having higher charge density.

[7]Dimethyldiallyl ammonium chloride

TABLE I

| AcAm/AMPIQ Copolymer Properties | | |
|---|---|---|
| Example No. | Charge Density (mole %) | RSV |
| 12 | 5.4 | 21.9 |
| 9 | 15 | 12.1 |
| 11 | 34 | 12.9 |

It is evident from the above examples that the polymers of the invention are particularly useful in treating sewage sludges that are highly alkaline, e.g. those having a pH of 11 or more.

We claim:

1. In a process of the type wherein organic suspensions comprising raw sewage sludge and sludges obtained by biological degradation are flocculated by adding to the suspension an aqueous solution of a cationic polymer and then dewatered the improvement which comprises treating the raw sewage sludge and sludges obtained by biological degradation with from 0.01–1% by weight based on the weight of the sludge solids with a cationic polymer having an intrinsic viscosity greater than 0.5 and which contains at least 5 mole percent of the dimethyl sulfate or the methyl chloride quaternary ammonium salt of 1-acryloyl-4-methyl piperazine.

2. The process of claim 1 where the cationic polymer is a copolymer of acrylamide which contains between 5–50 mole percent of the dimethyl sulfate or the methyl chloride quaternary ammonium salt of 1-acryloyl-4-methyl piperazine.

* * * * *